(12) United States Patent
Alacqua et al.

(10) Patent No.: US 9,630,560 B2
(45) Date of Patent: Apr. 25, 2017

(54) SHAPE MEMORY ACTUATOR WITH BISTABLE DRIVEN ELEMENT

(71) Applicant: SAES GETTERS S.P.A., Lainate (MI) (IT)

(72) Inventors: Stefano Alacqua, Como (IT); Francesco Butera, Como (IT)

(73) Assignee: SAES GETTERS S.P.A., Lainate (MI) (IT)

( * ) Notice: Subject to any disclaimer, the term of this patent is extended or adjusted under 35 U.S.C. 154(b) by 93 days.

(21) Appl. No.: 14/434,082

(22) PCT Filed: Oct. 8, 2013

(86) PCT No.: PCT/IB2013/059209
§ 371 (c)(1),
(2) Date: Apr. 7, 2015

(87) PCT Pub. No.: WO2014/057423
PCT Pub. Date: Apr. 17, 2014

(65) Prior Publication Data
US 2015/0274078 A1    Oct. 1, 2015

(30) Foreign Application Priority Data

Oct. 10, 2012   (IT) .......................... MI2012A001705

(51) Int. Cl.
*G02B 7/182* (2006.01)
*B60R 1/08* (2006.01)
*F03G 7/06* (2006.01)

(52) U.S. Cl.
CPC .............. *B60R 1/087* (2013.01); *B60R 1/086* (2013.01); *F03G 7/065* (2013.01)

(58) Field of Classification Search
CPC .......... B60R 1/086; B60R 1/087; F03G 7/065
See application file for complete search history.

(56) References Cited

U.S. PATENT DOCUMENTS 3,634,803 A * 1/1972 Willson ............. H01H 61/0107
                                                   337/123
6,364,496 B1 * 4/2002 Boddy ................... B60R 1/072
                                                   248/476

(Continued)

FOREIGN PATENT DOCUMENTS

| EP | 1013503 A1 | 6/2000 |
| EP | 1241351 A1 | 9/2002 |
| JP | 62006847 A | 1/1987 |

OTHER PUBLICATIONS

International Search Report mailed on Jul. 14, 2014 for PCT/IB2013/059209 filed on Oct. 8, 2013 in the name of SAES GETTERS S.P.A.

(Continued)

*Primary Examiner* — Thanh Luu
(74) *Attorney, Agent, or Firm* — Steinfl + Bruno LLP

(57) ABSTRACT

A shape memory actuator includes a supporting body, a driven element pivotably mounted on the supporting body and in permanent contact with a driving element whose movement is determined by a SMA actuating member and by at least one resilient return member acting in opposition to the SMA actuating member. The driven element is able to take two stable positions under the action of a bistable moving system connecting the driving element to the driven element such that each toggling between the two stable positions is due to an activation of the SMA actuating member, the latter being arranged together with the bistable moving system. The resilient return member, the driving element and the driven element on a same side of the supporting body are in a substantially co-planar arrangement.

9 Claims, 5 Drawing Sheets

(56) References Cited

U.S. PATENT DOCUMENTS

2004/0104580 A1  6/2004  Spiessl et al.
2005/0160858 A1  7/2005  Mernoe
2011/0154817 A1  6/2011  Zimmer et al.

OTHER PUBLICATIONS

Written Opinion mailed on Jul. 14, 2014 for PCT/IB2013/059209 filed on Oct. 8, 2013 in the name of SAES GETTERS S.P.A.

* cited by examiner

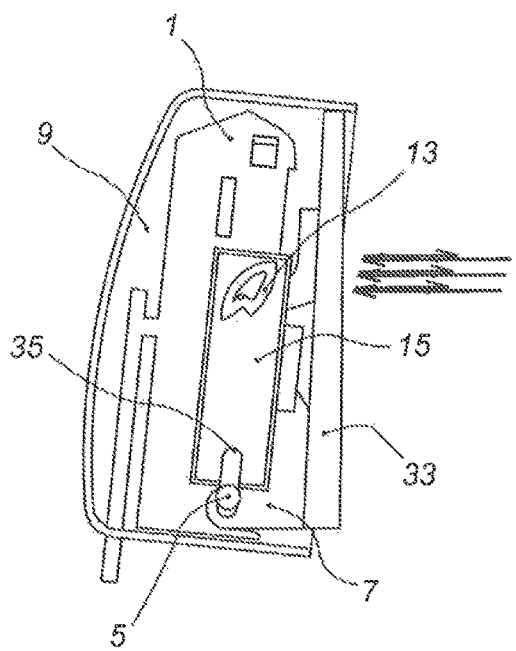
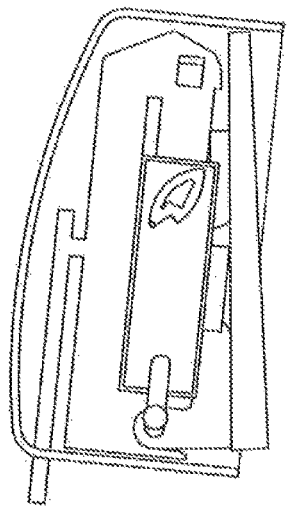
Fig.4a Fig.4b
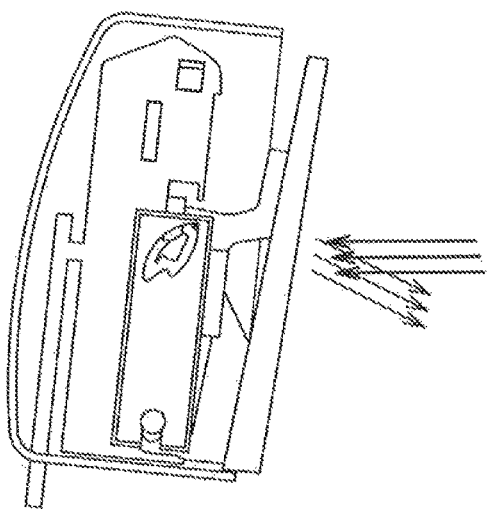
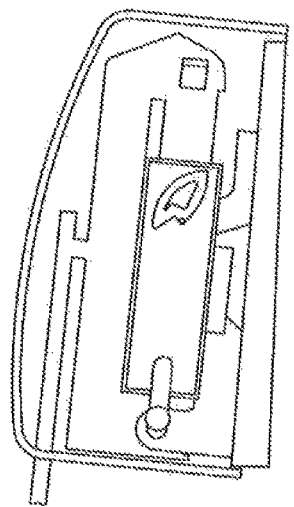
Fig.4c Fig.4d

SHAPE MEMORY ACTUATOR WITH BISTABLE DRIVEN ELEMENT

CROSS REFERENCE TO RELATED APPLICATIONS

The present application is the US national stage of International Patent Application PCT/IB2013/059209 filed internationally on Oct. 8, 2013 which, in turn, claims priority to Italian Patent Application No. MI2012A001705 filed on Oct. 10, 2012.

The present invention relates to shape memory actuators, i.e. actuators in which the actuating member consists of an element (for example a wire element) made from a shape memory alloy (indicated in the following as "SMA"), and in particular to an actuator in which the driven element is bistable, i.e. it is moved by a driving element between two stable positions. Although specific reference is made in the following to the use of a wire as actuating member, it should be noted that what is being said also applies to other similar shapes with a dimension much greater than the other two dimensions which are generally very small, e.g. strips and the like.

It is known that the shape memory phenomenon consists in the fact that a mechanical piece made of an alloy that exhibits said phenomenon is capable of transitioning, upon a temperature change, between two shapes that are preset at the time of manufacturing, in a very short time and without intermediate equilibrium positions. A first mode in which the phenomenon may occur is called "one-way" in that the mechanical piece can change shape in a single direction upon the temperature change, e.g. passing from shape A to shape B, whereas the reverse transition from shape B to shape A requires the application of a mechanical force.

On the contrary, in the so-called "two-way" mode both transitions can be caused by temperature changes, this being the case of the application of the present invention. This occurs thanks to the transformation of the micro-crystalline structure of the piece that passes from a type called martensitic (M), stable at lower temperatures, to a type called austenitic (A), stable at higher temperatures, and vice versa (M/A and A/M transition).

A SMA wire has to be trained so that it can exhibit its features of shape memory element, and the training process of a SMA wire usually allows to induce in a highly repeatable manner a martensite/austenite (M/A) phase transition when the wire is heated and to induce an austenite/martensite (A/M) phase transition when the wire is cooled. In the M/A transition the wire undergoes a shortening by 3-5% which is recovered when the wire cools down and through the A/M transition returns to its original length. This characteristic of SMA wires to contract upon heating and then to re-extend upon cooling has been exploited since a long time to obtain actuators that are very simple, compact, reliable, silent and inexpensive.

In particular, this type of actuator is used in some automatic anti-glare rear view mirrors to perform the movement of the mirror from a first position of high reflection to a second position of low reflection to achieve the anti-glare function, and vice versa. The change in the reflecting capacity is due to the fact that the mirror has a wedge-shaped cross-section with a low-reflection front surface and a high-reflection rear surface, whereby when the mirror is moved such that its high-reflection rear surface is tilted out of line with the driver's view the resulting view is actually a reflection off the low-reflection front surface.

This movement of the mirror reflecting surface between the two positions is made possible by the fact that it is carried by a mirror-holder that is pivoted to a supporting body through horizontal pivot pins (note that the mirror can be mounted on the mirror-holder or made integral therewith, i.e. the two elements can be made in one piece). In practice, in automatic anti-glare mirrors the actuator is controlled by a photodetecting device that upon detection of the glare condition automatically changes the position of the mirror. In this way, the driver is spared the trouble to change it manually through the relevant tab that extends from the bottom of the mirror in manual anti-glare mirrors, said tab acting as driving element of a bistable moving system of the mirror-holder that rotates the latter with respect to the supporting body.

A first example of such an automatic mirror is described in JP 62006847A that discloses the use of a pair of opposing coiled SMA wires to shift horizontally between two positions a slider (driving element) located between the supporting body and the mirror-holder (driven element) and in contact with the back side of the latter. Permanent contact of the slider with the mirror-holder is guaranteed by compressed (i.e. pushing) springs also arranged between the supporting body and the mirror-holder at a position opposite to the slider with respect to the axis of rotation of the mirror-holder. Since a horizontal ramp is formed on the back side of the mirror-holder along the path travelled by the slider, the latter will climb the ramp during its anti-glare run thus further compressing the springs and rotating the mirror (a reverse rotation will obviously occur when the slider descends the ramp during its return run).

This type of shape memory actuator has several drawbacks starting from the fact that it requires two SMA wires that must be constantly alternatively heated since at each position one of them is contracted and the other one is extended. Moreover, the slider must slide along the back side of the mirror-holder overcoming a significant friction due to the pressure exerted by the springs, this implying an adequate strength of the actuating member made up of the two SMA wires. Finally, the mirror-holder always retains the freedom to rotate around its axis of rotation because there is no rigid bidirectional restraint to prevent this, like in manual bistable mirrors, but only two unidirectional restraints consisting of the slider and the springs, and the latter is an elastic restraint. Consequently, the reflecting surface of the mirror can be subjected to vibrations (particularly in case of resonance) which negatively affect the driver's vision.

A second example of an automatic anti-glare mirror with a shape memory actuator is found in EP 1013503A1 that discloses a mirror-holder (driven element) in permanent contact with a pusher (driving element) slidably mounted within the supporting body, in a direction perpendicular thereto, and having a portion projecting from the back of the supporting body, i.e. on the side opposite to the mirror-holder. In this case the actuating member consists of a SMA wire arranged to extend over the rear end face of the pusher and having its ends connected to the back of the supporting body so that the wire has a V-shaped configuration with its vertex abutting on the pusher, whereby a contraction of the wire causes the pusher to slide forward so as to move the mirror-holder to its anti-glare position.

In this arrangement the permanent contact of the pusher with the mirror-holder is guaranteed by an articulated bidirectional restraint, yet return springs are still secured between the supporting body and the mirror-holder. However stretched (i.e. pulling) springs are used since they are located on the same side of the pusher with respect to the axis of rotation of the mirror-holder, although the same configuration as in JP 62006847A can easily be conceived. In this case the springs are used only to guarantee the return of the mirror-holder to the normal operating position upon cooling and re-extension of the SMA wire when the actuator is deactivated.

This type of shape memory actuator provides some improvements over the type described in JP 62006847A in that it requires only a single SMA wire that is heated only as long as the mirror stays in the anti-glare position. Furthermore, the perpendicular sliding motion of the pusher with respect to the supporting body and the mirror-holder articulated to the pusher allow for a smoother operation that requires a less strong actuating member. Nonetheless, also this known actuator still suffers from some drawbacks as to bulkiness in depth, due to the perpendicular configuration of the pusher and to the arrangement of the SMA wire on the back side of the supporting body, and to susceptibility to vibrations because the SMA wire always retains some elasticity even when contracted and therefore cannot guarantee a very stable position of the pusher and thus of the mirror-holder connected thereto.

The above-mentioned known actuators also share the feature of being intended to operate only under the control of the photodetector whereby the manual operation of the mirror is impossible if the driver for any reason requires so, unless a separate button for a manual override of the photodetector is provided thus increasing the complexity and cost of the actuator.

Therefore the object of the present invention is to provide a shape memory actuator which overcomes the above-mentioned drawbacks. This object is achieved by means of a shape memory actuator in which the driving element acted on by the SMA wire is mobile in a plane substantially parallel to the supporting body and is connected to the driven element through a bistable moving system, all these elements being arranged on the same side of the supporting body. Other advantageous features are disclosed in the dependent claims.

The main advantage of the actuator according to the invention stems from the fact that the driven element is always moved between two stable positions, like in manual actuators, thus preventing any substantial problem of vibrations and resonance. This also results in the SMA wire being activated only during its shortening run, since the SMA wire is deactivated upon toggling of the bistable moving system and both stable positions of the driven element are kept without the aid of the actuating member.

A second significant advantage of this actuator is its compactness in depth, since its components are enclosed between the supporting body and the mirror.

Another advantage of the present actuator resides in the fact that it can easily be configured also for manual activation by the driver who can act directly on the bistable moving system, whereby further controls for the photodetector override are not required thus making the manual/automatic actuator cheaper and more reliable.

These and other advantages and characteristics of the shape memory actuator according to the present invention will be clear to those skilled in the art from the following detailed description of two embodiments thereof, with reference to the annexed drawings wherein:

FIGS. 4a-4d are diagrammatic views showing the operation of the actuator;

Figure 1:
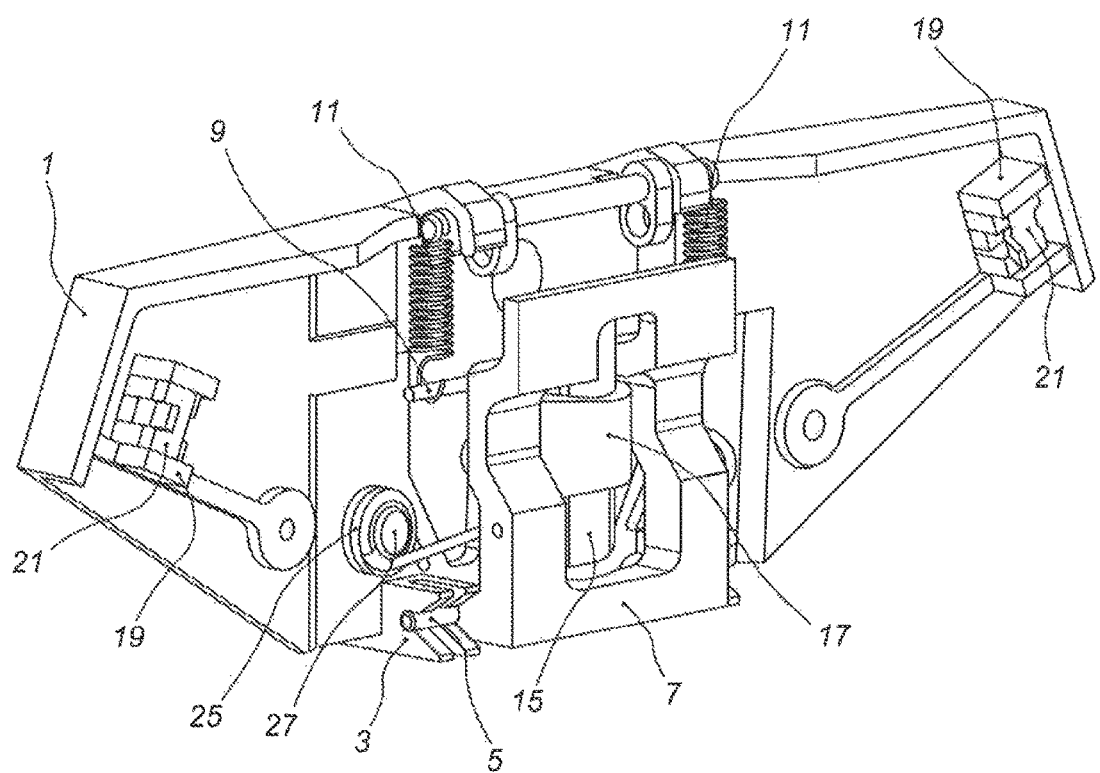
FIG. 1 is a perspective front view of the actuator with the SMA wire omitted for the sake of clarity.
Figure 2:
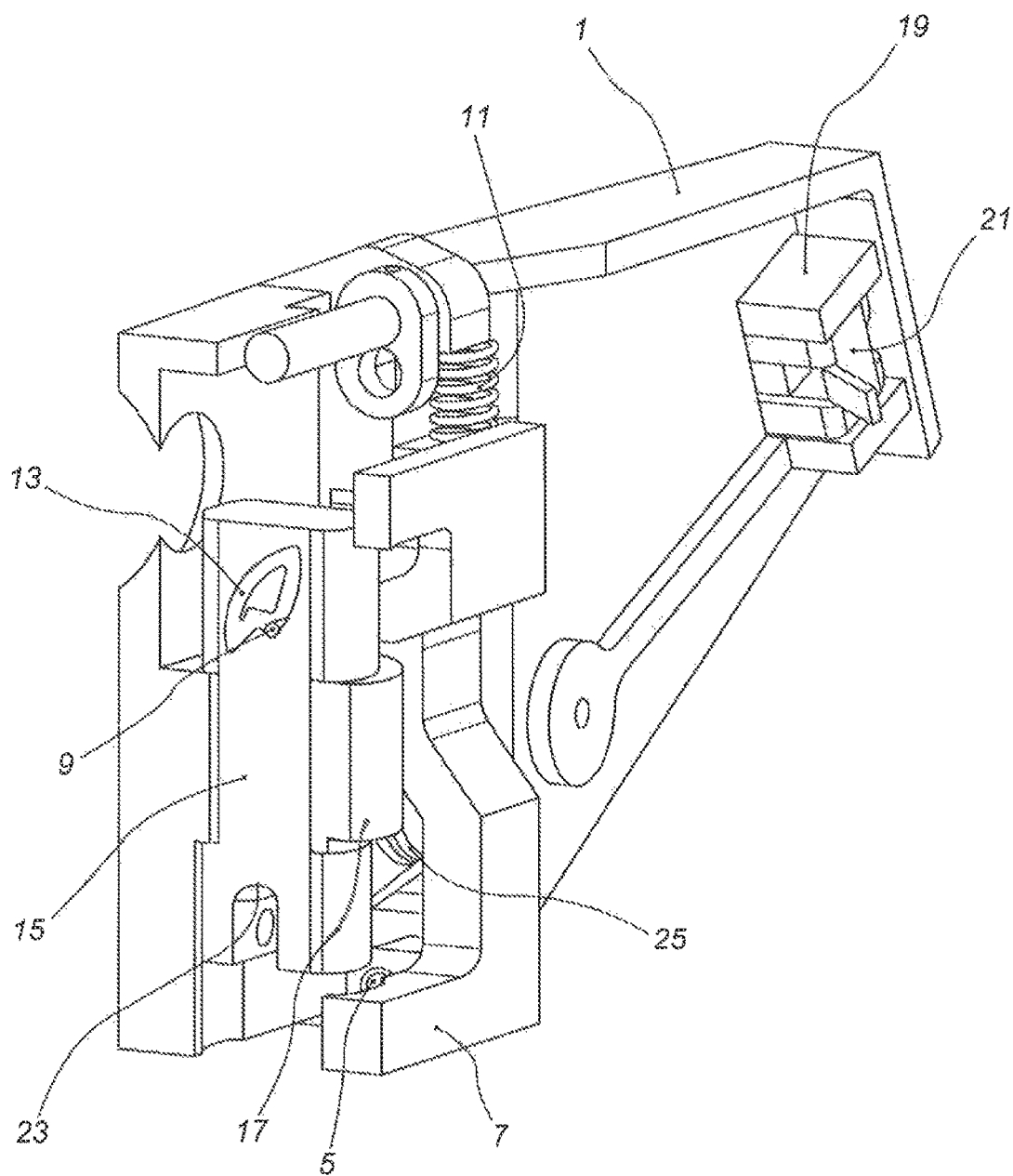
FIG. 2 is a vertical sectional view of the actuator of FIG. 1, taken along an almost central plane.

With reference to FIGS. 1 and 2, there is seen that an actuator according to the present invention includes a supporting body 1 that carries all the other components through suitable seats and couplings, these being different depending on the specific technical solutions adopted for the intended purpose of the actuator. In the particular embodiment illustrated in detail hereunder, the supporting body 1 is provided with bottom seats 3 that receive horizontal pivot pins 5 of a mirror-holder 7 that is also provided with upper horizontal motion pins 9. The external end of each motion pin 9 is connected to the top of body 1 through a pulling spring 11, while its internal end engages a shaped groove 13 formed in a central vertical pusher 15 that slides in a corresponding cylindrical guide 17.

Figure 5:
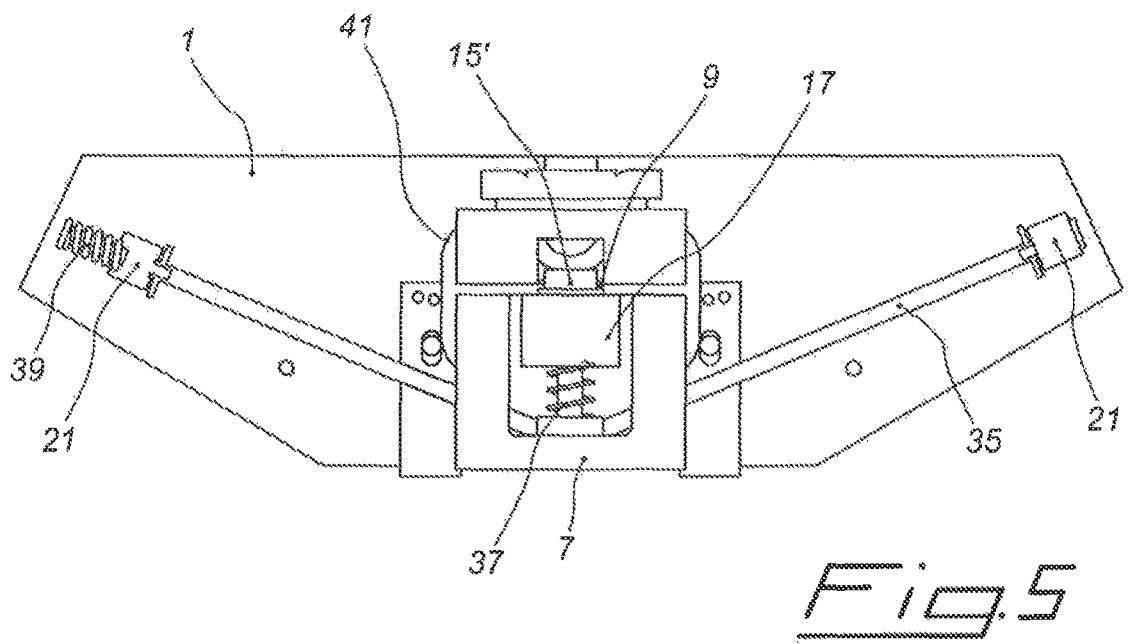
FIG. 5 is a front view of a second embodiment of the actuator.

Pusher 15 slides upwards upon activation of a SMA wire (not shown) extending between fixing points 19, where it is secured by locking members 21 that also provide the electrical supply, and passing in a notch 23 formed in the bottom face of pusher 15 so as to obtain a V-shaped configuration similar to that of EP 1013503A1 but in a vertical plane (see also FIG. 5). When the SMA wire is deactivated, pusher 15 slides downwards under the action of vertical torsion springs 25 mounted on pegs 27 of body 1 and whose free ends engage suitable seats (not shown) formed in pusher 15. The limits of the vertical reciprocating motion of pusher 15 are defined by groove 13 as will be better described further on.

In this arrangement the SMA wire is the actuating member, pusher 15 is the driving element, motion pins 9 and grooves 13 make up the bistable moving system and mirror-holder 7 is the driven element although, as already mentioned above, the driven element could be the mirror itself (not shown in these figures) if it is made integral with pivot pins 5 and motion pins 9.

In the light of the description above, and referring also to FIGS. 3 and 4a-4d, the simple and effective operation of the bistable shape memory actuator according to the present invention is readily understood.

The normal operating position illustrated in FIG. 4a is considered as the starting position and reference point, this being defined by a position sensor made up of a fixed portion 29 mounted on body 1 and a mobile portion 31 mounted on pusher 15. The position sensor can be of any known type suitable for the purpose, e.g. a Hall sensor 29 and a magnet 31 or a potentiometer 29 and a potentiometer cursor 31. In this normal position a mirror 33 mounted on mirror-holder 7 has its high-reflection surface in line with the driver's view whereas the low-reflection surface is out of line.

Figure 3:
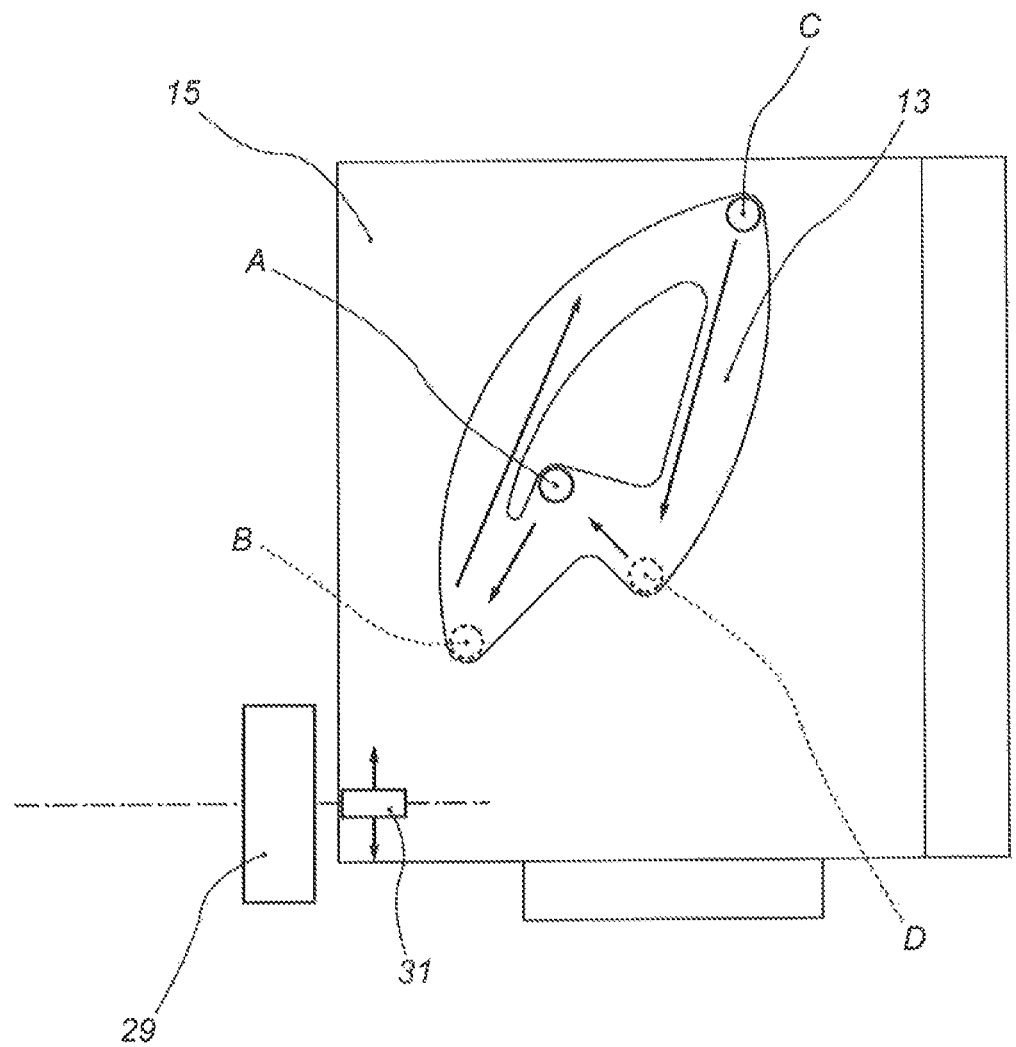
FIG. 3 is a diagrammatic view showing the bistable moving system in detail.

When the photodetecting device (not shown) detects a glare condition, the SMA wire 35 is heated by passing a current through it by means of locking members 21 so that it contracts and moves pusher 15 upwards. Due to the shape and arrangement of grooves 13, that have an inverted heart shape slanted forward, this upward motion of pusher 15 results in pins 9 passing from a first stable position A to a first temporary position B, as shown in FIG. 3, which in turn results in mirror-holder 7 rotating backward around pivot pins 5 as shown by the comparison of FIG. 4a to FIG. 4b.

As soon as position B is reached by pins 9, either as detected by the position sensor or as calculated through the time of activation of the SMA wire 35, the latter is deactivated so that it cools down and re-extends to its original length thus allowing the return springs 25 to move pusher 15 downwards. This downward motion of pusher 15 results in pins 9 passing from the first temporary position B to a second stable position C, which in turn results in mirror-holder 7 rotating forward around pivot pins 5 as shown by the comparison of FIG. 4b to FIG. 4c. In this second stable position C, whose reaching is verified by the position sensor, mirror 33 mounted on mirror-holder 7 has its low-reflection surface in line with the driver's view whereas the high-reflection surface is out of line thus achieving the anti-glare effect.

The reverse transition from the anti-glare position of FIG. 4c to the normal operating position of FIG. 4a, always upon command of the photodetector, requires another activation of the SMA wire 35 so that it contracts and moves pusher 15 upwards, this upward motion resulting in pins 9 passing from the second stable position C to a second temporary position D, which in turn results in mirror-holder 7 rotating backward as shown by the comparison of FIG. 4c to FIG. 4d.

As soon as position D is reached by pins 9, still either as detected by the position sensor or as calculated through the time of activation of the SMA wire 35 which in this case is longer, the latter is deactivated so that it cools down and re-extends to its original length thus allowing the return springs 25 to move pusher 15 downwards. This downward motion of pusher 15 results in pins 9 passing from the second temporary position D to the first stable position A, which in turn results in mirror-holder 7 rotating further backward as shown by the comparison of FIG. 4d to FIG. 4a. Obviously, also the reaching of this stable position is verified by the position sensor.

The actuator operation described above clearly shows how the present actuator achieves the previously mentioned advantages of moving the driven element between two stable positions by activating the SMA wire only for brief shortening runs, and of allowing also a manual activation by the driver who can act directly on the bistable moving system through pusher 15, provided that the latter projects downwards from the casing of the rear view mirror.

Figure 6:
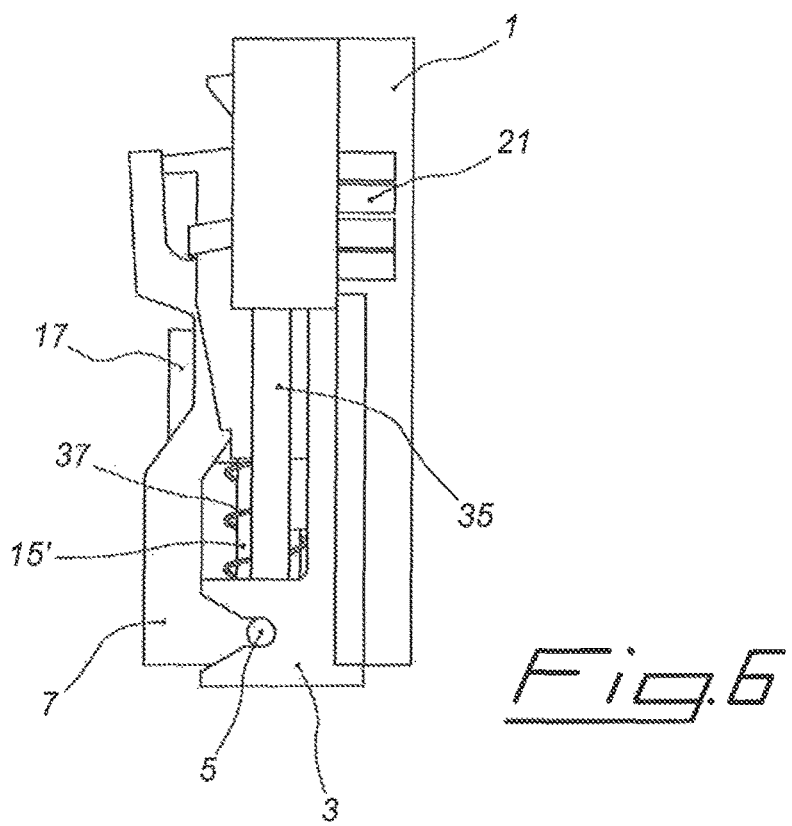
FIG. 6 is a side view of the actuator of FIG. 5.

Finally, FIGS. 5 and 6 show a second embodiment of the actuator that differs from the above-described actuator in a few details, each of which can be separately applied to the first embodiment of FIGS. 1 and 2.

A first difference resides in the replacement of the torsion springs 25 with a single vertical coiled spring 37 that is coaxially arranged on pusher 15' at an intermediate portion thereof of reduced diameter, so that spring 37 is compressed (i.e. loaded) against the sliding seat 17 upon contraction of the SMA wire 35. Clearly, this alternative embodiment is just exemplificative since a person skilled in the art could devise other arrangements of the spring(s) assuring the return of pusher 15/15' or the use of any other equivalent resilient element(s).

Another difference of this second embodiment is the addition of a coiled spring 39 coaxially arranged on the SMA wire 35 at an end portion thereof so that it can be compressed against the adjacent locking member 21 upon contraction of the V-shaped SMA wire 35. This spring 39 serves as a mechanical safety in case pusher 15' can not be moved for any reason, e.g. it is stuck in guide 17 or the bistable moving system is jammed, whereby the contraction of the SMA wire 35 would result in the rupture thereof because the shortening of the wire can not be turned into a shortening of the path between the two locking members 21. Obviously, the strength of spring 39 is selected such that in normal operation it remains uncompressed upon contraction of the SMA wire 35 thus causing the upwards sliding of pusher 15'.

A further difference of the second actuator is the pivotable connection between pins 9 and the top of body 1 that is provided not by springs 11 but by a connecting member 41 that can be either resilient or not. The side view of FIG. 6 also illustrates how the locking members 21 project from the back side of the supporting body 1 with contact reeds for the connection to the electronic control board located thereon.

It is clear that the above-described and illustrated embodiments of the bistable shape memory actuator according to the invention are just examples susceptible of various modifications. In particular, in addition to the above-mentioned variants, it should be noted that the bistable moving system can be of any other known type, such as those used in retractable pens, as long as it can be fitted between the driving element and the driven element and it provides the required back-and-forth oscillation of the latter merely through the reciprocating motion of the former.

Moreover, the symmetrical arrangement of springs 11 and 25, of pins 9 and grooves 13, of fixing points 19, etc. is preferable for a smooth operation of the actuator but not strictly indispensable, whereby an asymmetrical arrangement of these elements and/or the elimination of one of them (e.g. using only one spring 11 or 25, using only one pin 9 and groove 13) could be conceived. Similarly, the arrangement of many elements could be reversed with substantial equivalence of operation, e.g. forming pins 9 on pusher 15 and grooves 13 in mirror-holder 7, or forming pivot pins 5 on supporting body 1 and the corresponding seats 3 in mirror-holder 7.

Finally, it should also be noted that in the above-described operation of the present actuator directional terms such as vertical/horizontal, upward/downward, forward/backward, etc. are referred to the specific illustrated embodiment and are not meant to be limitative since the actuator could operate also upside-down, horizontally or with any other particular orientation that a given application might require.

Similarly, despite the fact that the detailed description in this application illustrates the present actuator applied to an automatic anti-glare rear view mirror for vehicles, this is not intended to limit in any way the possibility of applying said actuator to other devices that can benefit from the features thereof (e.g. a window opening device).

The invention claimed is:
1. A shape memory actuator comprising:
a supporting body, a driven element pivotably mounted on said supporting body,
a SMA actuating member having a V-shaped configuration, wherein both ends of the SMA actuating member are secured by locking members to said supporting body, and
a driving element in permanent contact with said driven element,
wherein movement of the driven element is determined by said SMA actuating member and by at least one resilient return member acting in opposition to the SMA actuating member, the driven element being able to take two stable positions under action of a bistable moving system connecting said driving element to the driven element such that each toggling between said two stable positions is due to an activation of the SMA actuating member, and wherein the SMA actuating member, said bistable moving system, said resilient return member, the driving element and the driven element are enclosed in the supporting body.

2. The shape memory actuator according to claim 1, wherein the SMA actuating member is mounted on the supporting body with a resilient member suitable to be compressed enough to absorb the contraction of the SMA actuating member as an alternative to the movement of the driving element in case the latter can not be moved.

3. The shape memory actuator according to claim 1, wherein the bistable moving system is also pivotably connected to the supporting body through at least one resilient return member.

4. The shape memory actuator according to claim 1, wherein the at least one resilient return member acting in opposition to the SMA actuating member is a coiled spring that is arranged on the driving element such as to be loaded upon activation of the SMA actuating member.

5. The shape memory actuator according to claim 1, wherein the bistable moving system includes at least one pin engaging at least one groove that has a shape such that a first activation of the SMA actuating member results in said pin passing from a first stable position to a first temporary position and the subsequent deactivation of the SMA actuating member results in pin passing from said first temporary position to a second stable position under the action of at least one resilient return member, and a second activation of the SMA actuating member results in pin passing said second stable position to a second temporary position and the subsequent deactivation of the SMA actuating member results in pin passing from said second temporary position to the first stable position under the action of at least one resilient return member.

6. The shape memory actuator according to claim 5, wherein the supporting body is provided with bottom seats that receive horizontal pivot pins of a driven element that is also provided with upper horizontal motion pins whose external ends are connected to the top of said supporting body through pulling springs while their internal end engage shaped grooves formed in a central vertical pusher that slides in a corresponding cylindrical guide under the action of a SMA wire arranged in a V-shaped configuration extending between fixing points, where it is secured by the locking members that also provide the electrical supply, and passing in a notch formed in the bottom face of said pusher and under the action of vertical torsion springs mounted on pegs of the supporting body and whose free ends engage suitable seats formed in the pusher, the limits of the vertical reciprocating motion of the latter being defined by said shaped groove.

7. An anti-glare rear view mirror comprising the actuator according to claim 1.

8. The anti-glare rear view mirror according to claim 7, further comprising a photodetecting device that upon detection of the glare condition automatically changes through the actuator the position of the reflecting surface of a mirror from a high-reflecting surface to a low-reflecting surface and then automatically restores the normal operating position in the absence of glare.

9. The anti-glare rear view mirror according to claim 7, further comprising an external mechanical control for the manual activation of the actuator.

* * * * *